United States Patent Office 3,320,199
Patented May 16, 1967

3,320,199
AQUEOUS EMULSIONS OF VINYL ACETATE-VI-
NYL SULFONIC ACID COPOLYMERS, AND
METHOD OF PREPARATION
Julius J. Brezinski, St. Albans, and Howard M. Rife,
Charleston, W. Va., assignors to Union Carbide Corporation, a corporation of New York
No Drawing. Continuation of application Ser. No. 5,369,
Jan. 29, 1960. This application Dec. 21, 1964, Ser. No.
420,140
25 Claims. (Cl. 260—29.6)

This application is a continuation application of copending application Ser. No. 5,369, entitled, "Novel Emulsions Suitable for Use in High-Gloss Paints," filed Jan. 29, 1960, and now abandoned.

This invention relates to novel aqueous emulsions of vinyl acetate polymers suitable for use as binders in high-gloss water-based paints.

The use of aqueous emulsions of homopolymers and copolymers of vinyl acetate as paint binders is known. However, such emulsions are of limited value since they are incapable of producing high-gloss coatings in the presence of large quantities of pigment.

It has now been discovered, in accordance with the instant invention, that stable aqueous emulsions of vinyl acetate polymers, suitable for use as binders in high-gloss water-based paints, can be prepared by polymerizing vinyl acetate with a minor amount of a vinyl sulfonate salt in water in the presence of certain anionic and nonionic surfactants. Such emulsions are characterized by excellent shelf-life, excellent stability to alternate cycles of freezing and thawing, and excellent stability to dilution. Films cast from such emulsions are characterized by excellent clarity and excellent surface gloss. When such emulsions are employed in paints, coating characterized by high-gloss moduli at high pigment-volume concentrations can be obtained therefrom. Thus, a spectral gloss modulus of 75 to 80 can be obtained from coatings cast from paints having pigment-volume concentrations of from 16 percent to 20 percent. Pigment-volume concentration is a measure of the amount of pigment employed with a given quantity of binder resin. It is, of course, desirable to employ paints having as high a pigment-volume concentration as possible without sacrificing the gloss of the film obtained from the pigmented system. The pigment-volume concentration of a system can be determined in accordance with the following formula:

Pigment-volume concentration (percent) =

$$\frac{\frac{\text{weight of pigment}}{\text{sp. gr. of pigment}}}{\frac{\text{wt. of pigment}}{\text{sp. gr. of pigment}} + \frac{\text{wt. of emulsion}}{\text{sp. gr. of emulsion}}}$$

The emulsions of the instant invention are prepared by polymerizing vinyl acetate with a minor amount of a vinyl sulfonate salt, by means of a polymerization catalyst, in an aqueous solution of certain anionic and nonionic surfactants. Optionally, the emulsion may also contain a water-soluble buffering agent and a filming aid, which compounds can be added either before or after polymerization.

Polymerization according to the process of the instant invention can be brought about by admixing the necessary components of the emulsion and heating the mixture at a temperature of from 65° C. to 85° C., preferably from 75° C. to 85° C. Preferably, polymerization is effected in the absence of oxygen. Since the polymerization reaction goes essentially to completion, all but a very small fraction of the initial charge of vinyl acetate and vinyl sulfonate salt is consumed in the reaction. Hence the amount of polymer present in the final emulsion is essentially equal to the sum of the initial charge of vinyl acetate and vinyl sulfonate salt employed.

In order to produce satisfactory emulsions suitable for use in the preparation of high-gloss water-based paints, the components of the aqueous emulsion must be employed therein within certain rather narrow critical ranges. Thus, the concentration of vinyl acetate-vinyl sulfonate polymer should be maintained between 49.7 percent by weight to 56.9 percent by weight, preferably from 52.75 percent by weight to 55.85 percent by weight, of the total overall weight of the emulsion. Such concentrations are obtained by polymerizing from 49.5 percent by weight to 56.5 percent by weight, preferably from 52.5 percent by weight to 55.5 percent by weight, of vinyl acetate with from 0.2 percent by weight to 0.4 percent by weight, preferably from 0.25 percent by weight to 0.35 percent by weight, of the vinyl sulfonate salt, based on the total weight of the overall mixture. The polymers obtained from such polymerization contain from 99.3 mole percent to 99.7 mole percent, preferably from 99.47 mole percent to 99.63 mole percent, of combined vinyl acetate, and from 0.3 mole percent to 0.6 mole percent, preferably from 0.37 mole percent to 0.53 mole percent, of combined vinyl sulfonate salt.

As will be evident from the above, only minor amounts of the vinyl sulfonate salt are employed in the polymerization and are present in the polymers. The use of greater amounts of such salts is undesirable because higher concentrations cause increased water sensitivity of the films produced from paints containing such polymers. The vinyl sulfonate salts which can be employed are the alkali metal and ammonium salts of vinyl sulfonic acid, including sodium vinyl sulfonate, potassium vinyl sulfonate, lithium vinyl sulfonate, and ammonium vinyl sulfonate.

The choice of anionic and nonionic surfactants employed in the aqueous emulsions of the instant invention is critical since only certain surfactants will produce stable emulsions capable of being used to produce high-gloss paints. The anionic surfactants which have been found capable of producing satisfactory emulsions are the alkali metal and ammonium alkyl sulfate salt wherein the alkyl radicals each contain from 10 to 18 carbon atoms, preferably from 12 to 14 carbon atoms. Typical of the alkyl sulfate salts which can be employed are such compounds as sodium decyl sulfate, sodium tridecyl sulfate, sodium lauryl sulfate, sodium tetradecyl sulfate, sodium octadecyl sulfate, potassium decyl sulfate, potassium tetradecyl sulfate, ammonium tridecyl sulfate, ammonium octadecyl sulfate, lithium lauryl sulfate and the like. These compounds can be employed individually or in various combinations thereof. In order to produce satisfactory emulsions suitable for use in the preparation of high-gloss water-based paints, the concentration of anionic surfactant should be maintained between 0.25 percent by weight to 0.40 percent by weight, preferably from 0.27 percent by weight to 0.35 percent by weight, of the total overall weight of the emulsion.

The nonionic surfactants which have been found capable of producing satisfactory emulsions include certain polyalkylene glycol ethers. Among the polyalkylene glycol ethers which can be employed are compounds which can be depicted by the general formula:

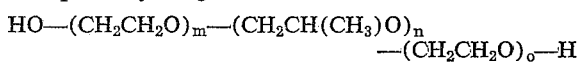

$$\text{HO—(CH}_2\text{CH}_2\text{O)}_m\text{—(CH}_2\text{CH(CH}_3)\text{O)}_n$$
$$\text{—(CH}_2\text{CH}_2\text{O)}_o\text{—H}$$

wherein $m$, $n$ and $o$ are whole integers having a value sufficient to impart an average molecular weight of from 2000 to 3500, preferably from 2500 to 3000, to the polyethylene glycol ether, there being from 20 percent by weight to 80 percent by weight, preferably from 30 percent by weight to 50 percent by weight, of —$\text{CH}_2\text{CH}_2\text{O}$— radicals present in said polyalkylene glycol ether. Also illustrative of the polyalkylene glycol ethers which can be employed are compounds which can be depicted by the general formula:

$$RO\text{—}(CH_2CH(CH_3)O)_p\text{—}(CH_2CH_2O)_q\text{—}H$$

wherein R represents an alkyl radical having from 1 to 8 carbon atoms, preferably from 3 to 5 carbon atoms, and $p$ and $q$ are whole integers having a value sufficient to impart an average molecular weight of from 2000 to 3500, preferably from 2500 to 3000, to the polyalkylene glycol ether, there being from 20 percent by weight to 80 percent by weight, preferably from 30 percent by weight to 50 percent by weight, of —$CH_2CH_2O$— radicals present in said polyalkylene glycol ether. Further illustrative of the polyalkylene glycol ethers which can be employed are compounds which can be depicted by the general formula:

$$RO\text{—}Z\text{—}(CH_2CH_2O)_r\text{—}H$$

wherein R represents an alkyl radical having from 1 to 8 carbon atoms, preferably from 3 to 5 carbon atoms, Z represents a combination of $$\text{—}CH_2CH_2O\text{— and —}CH_2CH(CH_3)O\text{—}$$

radicals containing from 2 percent by weight to 5 percent by weight of —$CH_2CH_2O$— radicals, and $r$ is a whole integer, there being a sufficient number of $$\text{—}CH_2CH_2O\text{— and —}CH_2CH(CH_3)O\text{—}$$

radicals present to impart an average molecular weight of from 2000 to 3500, preferably from 2500 to 3000, to the polyalkylene glycol ether, and there being from 20 percent by weight to 80 percent by weight, preferably from 30 percent by weight to 50 percent by weight, of —$CH_2CH_2O$— radicals present in said polyalkylene glycol ether.

In order to produce satisfactory emulsions suitable for use in the preparation of high-gloss water-based paints, the concentration of nonionic surfactant should be maintained between 0.7 percent by weight to 1.5 percent by weight, preferably from 0.8 percent by weight to 1.2 percent by weight, of the total overall weight of the emulsion.

Any water soluble vinyl polymerization catalyst can be employed in effecting polymerization according to the process of the instant invention. Typical of the vinyl polymerization catalysts which can be employed are such compounds as potassium persulfate, ammonium persulfate, sodium persulfate, potassium perborate, ammonium perborate, sodium perborate, hydrogen peroxide and the like. These compounds can be employed individually or in various mixtures thereof. The catalyst should be employed in an amount of from 0.05 percent by weight to 0.3 percent by weight, preferably from 0.1 percent by weight to 0.2 percent by weight, of the total overall weight of the emulsion.

It has been found that the shelf-life of the aqueous emulsions of the instant invention can be prolonged beyond a period of 12 months if the pH of the emulsion is maintained between 3.9 and 5.2. Consequently, the use of a buffering agent is desirable in order to maintain the pH of the emulsion within the recommended range, and any water-soluble buffering agent which will maintain the pH of the emulsion within this range can be employed. Typical of the buffering agents which can be employed are such compounds as sodium acetate, potassium acetate, sodium bicarbonate, sodium carbonate, sodium phosphate, potassium phosphate and the like. These compounds can be employed individually or in various combinations thereof.

The use of a filming aid in the aqueous emulsion of the instant invention is preferred in order to improve the filming potential of the emulsion at low temperatures, and to improve the compatibility of the various ingredients of the emulsion. In addition, the use of a filming aid imparts greater stability to the emulsion and improves the gloss obtainable from paints produced from such emulsions. Any water-soluble filming aid can be employed for this purpose. Typical of the filming aids which can be employed are such compounds as 2-(2-ethoxyethoxy) ethanol, 2-(2-ethoxyethoxy)ethyl acetate, 2(2-butoxyethoxy)ethyl acetate, ethylene glycol diacetate and the like. These compounds can be employed individually or in various mixtures thereof. The filming aid should be employed in an amount of from 0.2 percent by weight to 2.0 percent by weight, preferably from 0.4 percent by weight to 1.5 percent by weight, of the total overall weight of the emulsion.

The water employed in the aqueous emulsions of the instant invention should be employed in an amount of from 41.0 percent by weight to 48.0 percent by weight, preferably from 42.0 percent by weight to 45.0 percent by weight, of the total overall weight of the emulsion.

The following examples are set forth for purposes of illustration so that those skilled in the art may better understand this invention, and it should be understood that they are not to be construed as limiting this invention in any manner.

*Example I*

An admixture of 6.8 grams of "Tergitol 3" (sodium tridecyl sulfate), 13.6 grams of "Tergitol XH" (a polyalkylene glycol ether), 5.94 grams of sodium vinyl sulfonate, 3.4 grams of sodium acetate, 3.4 grams of potassium persulfate, 6.8 grams of "Carbitol" (2-(2-ethoxyethoxy)ethanol) and 743.8 grams of water was prepared, and sparged with nitrogen to remove oxygen. To the resulting water-clear solution were added 46.0 grams of vinyl acetate, and the resulting mixture was heated at a temperature of 75° C. until all the vinyl acetate had polymerized. An additional 872 grams of vinyl acetate were then added over a period of two hours while the temperature of the resulting mixture was maintained at from 78° C. to 82° C. Following this, the mixture was heated for an additional hour at a temperature of from 82° C. to 85° C. to insure complete polymerization.

The resulting emulsion had a concentration of unreacted vinyl acetate of 0.47 percent by weight, a total nonvolatile content of 55.6 percent by weight, and a pH of 4.6. The size of the solid particles present in the emulsion, as determined by means of an electron micrograph, ranged from 0.05 to 0.32 micron, with the mean particle size being 0.18 micron. The viscosity of the emulsion as determined on a Brookfield Viscometer, Model LVF, at 60 r.p.m. using a No. 4 spindle, was 1200 centipoises. The absolute viscosity of the emulsion, as determined with a Ubbelhode Viscometer on a mixture of 3.6 parts of the emulsion in 3.4 parts of water and 93 parts of dimethyl formamide was 3.5 centipoises.

The emulsion was stored for over 15 months without any noticeable change in viscosity. When a sample of the emulsion was heated at a temperature of 80° C. for 18 hours, no thickening or coagulation of the emulsion occurred. Likewise, no thickening or coagulation was observed when a sample of the emulsion was successively frozen at −6° F. and then thawed through five cycles. When a 100-ml. sample of the emulsion was diluted to a solids concentration of 6 percent by weight, less than 0.1 cc. of solids settled out from the emulsion.

A film cast from the emulsion on a black background was optionally clear and had a gloss modulus of 195 at 60° on a Gardner Gloss Meter as determined in accordance with A.S.T.M. method D523–53P. The film haze, as determined in accordance with A.S.T.M. Designations D1003–52 A.S.T.M. Standards, 1955, pp. 320–326, Procedure A, was 0.7 percent.

The emulsion was used in the preparation of a water-based paint. The paint was prepared by charging 208.8 grams of "Titanox RA–50" (high hiding rutile titanium dioxide modified only for fast wetting and reduction of after-yellowing of vehicles), 4.2 grams of a 25 percent by weight aqueous solution of "Tamol 731" (a pigment dispersant consisting of the sodium salts of carboxylated polyelectrolytes), 0.4 gram of pine oil and 110.6 grams of water to a pebble mill, grinding the mixture together over a period of 18 hours, and then adding, in the order stated, 1.1 grams of "Colloid 581B" (a commercial defoamer), 13.2 grams of ethylene glycol, 564.4 grams of the emulsion prepared in accordance with the above procedure, 15.6 grams of "Butyl Carbitol Acetate" (2-(2-butoxyethoxy)ethyl acetate), and a mixture of 66.1 grams of water and 15.6 grams of dimethyl formamide to the mixture.

The resulting paint had a non-volatile content of 54.0 percent by weight, and a viscosity of 680 centipoises, as determined on a Brookfield Viscometer, Model LVF, at 60 r.p.m. using a No. 4 spindle.

A film from the paint brushed on a VF-1301 primed Morest chart had a gloss modulus of 78 at 60° on a Gardner Gloss Meter as determined in accordance with A.S.T.M. method D523-53P. The film, after aging for one week, withstood more than 1000 cycles of scrubbing on a Gardner Washability Machine employing a 0.5 percent by weight solution of Ivory soap.

The pigment-volume concentration of the paint was 15.6 percent.

*Example II*

An admixture of 4.25 grams of sodium vinyl sulfonate, 4.68 grams of "Sipon WD" (sodium lauryl sulfate), 17.0 grams of "Tergitol XD" (a polyalkylene glycol ether), 1.7 grams of potassium persulfate, 2.55 grams of sodium acetate, 17.0 grams of "Carbitol Acetate" (2-(2-ethoxyethoxy)ethyl acetate) and 750.9 grams of water was prepared, and sparged with nitrogen to remove oxygen. To the resulting water-clear solution were added 54 grams of vinyl acetate, and the resulting mixture was heated at a temperature of 75° C. until all the vinyl acetate had polymerized. An additional 847 grams of vinyl acetate were then added over a period of two hours while the temperature of the resulting mixture was maintained at from 78° C. to 82° C. Following this, the mixture was heated for an additional hour at a temperature of from 82° C. to 85° C. to insure complete polymerization.

The resulting emulsion had a concentration of unreacted vinyl acetate of 0.29 percent by weight, a total non-volatile content of 54.4 percent by weight, and a pH of 4.9. The size of the solid particles present in the emulsion, as determined by means of an electron micrograph, ranged from 0.06 to 0.24 micron, with the mean particle size being 0.18 micron. The viscosity of the emulsion, as determined on a Brookfield Viscometer, Model LVF, at 60 r.p.m. using a No. 4 spindle, was 1200 centipoises. The absolute viscosity of the emulsion, as determined with a Ubbelhode Viscometer on a mixture of 3.6 parts of the emulsion in 3.4 parts of water and 93 parts of dimethyl formamide was 2.3 centipoises.

The emulsion was stored for over 15 months without any noticeable change in viscosity. When a sample of the emulsion was heated at a temperature of 80° C. for 18 hours, no thickening or coagulation of the emulsion occurred. Likewise no thickening or coagulation was observed when a sample of the emulsion was successively frozen at −6° F. and then thawed through five cycles. When a 100-ml. sample of the emulsion was diluted to a solids concentration of 6 percent by weight, less than 0.1 cc. of solids settled out from the emulsion.

A film cast from the emulsion on a black background was optically clear and had a gloss modulus of 200 at 60° on a Gardner Gloss Meter as determined in accordance with A.S.T.M. method D523-53P. The film haze, as determined in accordance with A.S.T.M. Designations D1003-52 A.S.T.M. Standards, 1955, pp. 320-326, Procedure A, was 0.4 percent.

The emulsion was used in the preparation of a water-based paint. The paint was prepared by charging 216.1 grams of "Ti-Pure R-100" (rutile titanium dioxide), 4.3 grams of a 25 percent by weight aqueous solution of "Tamol 731" (a pigment dispersant consisting of the sodium salts of carboxylated polyelectrolytes), 13.7 grams of ethylene glycol, 24.4 grams of "Carbitol" (2-(2-ethoxyethoxy)ethanol), 0.47 gram of "Bubble Breaker 746" (a commercial defoamer) and 31.2 grams of water to a pebble mill, grinding the mixture together over a period of 18 hours, and then adding, in the order stated, 547.8 grams of the emulsion prepared in accordance with the above procedure, 4.13 additional grams of "Bubble Breaker 746," 3.9 grams of "Surfactol 318" (water-dispersible castor oil derivatives resulting from the partial esterification of polyols with ricinoleic acid), a mixture of 3.9 grams of "Tetronic 504" (ethylene and propylene oxide addition products on ethylenediamene) and 23.2 grams of "Polypropylene glycol 425" (a polypropylene glycol) in 17.6 grams of water, 30.6 grams of "Butyl Cellosolve Acetate" (2-butoxyethyl acetate), and 78.7 grams of a 4 percent by weight aqueous solution of "Polyox WSR-301" (a polyethylene oxide).

The resulting paint had a non-volatile content of 53.1 percent by weight, and a viscosity of 630 centipoises, as determined on a Brookfield Viscometer, Model LVF, at 60 r.p.m. using a No. 4 spindle.

A film from the paint brushed on a VF-1301 Morest chart had a gloss modulus of 75 at 60° on a Gardner Gloss Meter as determined in accordance with A.S.T.M. method D523-53P. The film, after aging for one week, withstood more than 1000 cycles of scrubbing on a Gardner Washability Machine employing a 0.5 percent by weight solution of Ivory soap.

The pigment-volume concentration of the paint was 16.6 percent.

What is claimed is:

1. A mixture suitable for use in the preparation of high-gloss water-based paints consisting of:
   (a) from 49.5 percent by weight to 56.5 percent by weight of vinyl acetate;
   (b) from 0.2 percent by weight to 0.4 percent by weight of a compound selected from the group consisting of alkali metal and ammonium salts of vinyl sulfonic acid;
   (c) from 0.25 percent by weight to 0.40 percent by weight of a compound selected from the group consisting of alkali metal and ammonium alkyl sulfate salts wherein the alkyl radicals each contain from 10 to 18 carbon atoms;
   (d) from 0.7 percent by weight to 1.5 percent by weight of a polyalkylene glycol ether selected from the group consisting of: polyalkylene glycol ethers represented by the general formula

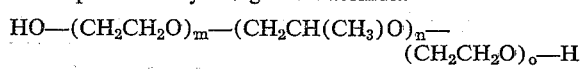

HO—(CH$_2$CH$_2$O)$_m$—(CH$_2$CH(CH$_3$)O)$_n$—(CH$_2$CH$_2$O)$_o$—H wherein *m*, *n* and *o* are whole integers having a value sufficient to impart an average moleculuar weight of from 2000 to 3500 to the polyalkylene glycol ether, there being from 20 percent by weight to 80 percent by weight of —CH$_2$CH$_2$O— radicals present in said polyalkylene glycol ether; polyalkylene glycol ethers represented by the general formulua

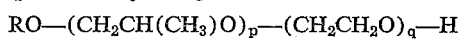

RO—(CH$_2$CH(CH$_3$)O)$_p$—(CH$_2$CH$_2$O)$_q$—H wherein R represents an alkyl radical having from 1 to 8 carbon atoms, and *p* and *q* are whole integers having a value sufficient to impart an average molecular weight of from 2000 to 3500 to the polyalkylene glycol ether, there being from 20 percent by weight to 80 percent by weight of —CH$_2$CH$_2$O— radicals present in said polyalkylene glycol ether; and polyalkylene glycol ethers represented by the general formula

RO—Z—(CH$_2$CH$_2$O)$_r$—H wherein R represents an alkyl radical having from 1 to 8 carbon atoms, Z represents a combination of —CH$_2$CH$_2$O— and —CH$_2$CH(CH$_3$)O— radicals containing from 2 percent by weight to 5 percent by weight of —$CH_2CH_2O$— radicals, and $r$ is a whole integer, there being a sufficient number of —$CH_2CH_2O$— and —$CH_2CH(CH_3)O$— radicals present to impart an average molecular weight of from 2000 to 3500 to the polyalkylene glycol ether, and there being from 20 percent by weight to 80 percent by weight of —$CH_2CH_2O$— radicals present in said polyalkylene glycol ether;

(e) from 0.05 percent by weight to 0.3 percent by weight of a water-soluble vinyl polymerization catalyst; and (f) from 41.0 percent by weight to 48.0 percent by weight of water.

2. A mixture as in claim 1 wherein the mixture also contains a water-soluble buffering agent capable of maintaining the pH of the mixture between 3.9 and 5.2.

3. A mixture as in claim 2 wherein the mixture also contains from 0.2 percent by weight to 2.0 percent by weight of a water-soluble filming aid.

4. A mixture as in claim 2 wherein the vinyl sulfonic acid salt is sodium vinyl sulfonate.

5. A mixture as in claim 3 wherein the vinyl sulfonic acid salt is sodium vinyl sulfonate.

6. A mixture as in claim 3 wherein the buffering agent is sodium acetate.

7. A mixture as in claim 5 wherein the buffering agent is sodium acetate.

8. An aqueous emulsion suitable for use in high-gloss water-based paints prepared by heating the mixture of claim 1 at a temperature of from 65° C. to 85° C.

9. An aqueous emulsion suitable for use in high-gloss water-based paints prepared by heating the mixture of claim 2 at a temperature of from 65° C. to 85° C.

10. An aqueous emulsion suitable for use in high-gloss water-based paints prepared by heating the mixture of claim 3 at a temperature of from 65° C. to 85° C.

11. An aqueous emulsion suitable for use in high-gloss water-based paints prepared by heating the mixture of claim 4 at a temperature of from 65° C. to 85° C.

12. An aqueous emulsion suitable for use in high-gloss water-based paints prepared by heating the mixture of claim 5 at a temperature of from 65° C. to 85° C.

13. An aqueous emulsion suitable for use in high-gloss water-based paints prepared by heating the mixture of claim 6 at a temperature of from 65° C. to 85° C.

14. An aqueous emulsion suitable for use in high-gloss water-based paints prepared by heating the mixture of claim 7 at a temperature of from 65° C. to 85° C.

15. An aqueous emulsion suitable for use in high-gloss water-based paints prepared by heating, at a temperature of from 65° C. to 85° C., a mixture consisting of:

(a) from 49.5 percent by weight to 56.5 percent by weight of vinyl acetate;

(b) from 0.2 percent by weight to 0.4 percent by weight of sodium vinyl sulfonate;

(c) from 0.25 percent by weight to 0.40 percent by weight of sodium tridecyl sulfate;

(d) from 0.7 percent by weight to 1.5 percent by weight of a polyalkylene glycol ether selected from the group consisting of: polyalkylene glycol ethers represented by the general formula

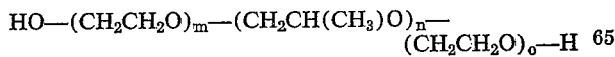
HO—$(CH_2CH_2O)_m$—$(CH_2CH(CH_3)O)_n$—$(CH_2CH_2)_o$—H wherein $m$, $n$ and $o$ are whole integers having a value sufficient to impart an average moleculuar weight of from 2000 to 3500 to the polyalkylene glycol ether, there being from 20 percent by weight to 80 percent by weight of —$CH_2CH_2O$— radicals present in said polyalkylene glycol ether; polyalkylene glycol ethers represented by the general formula

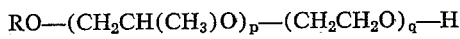
RO—$(CH_2CH(CH_3)O)_p$—$(CH_2CH_2O)_q$—H wherein R represents an alkyl radical having from 1 to 8 carbon atoms, and $p$ and $q$ are whole integers having a value sufficient to impart an average molecular weight of from 2000 to 3500 to the polyalkylene glycol ether, there being from 20 percent by weight to 80 percent by weight of —$CH_2CH_2O$— radicals present in said polyalkylene glycol ether; and polyalkylene glycol ethers represented by the general formula

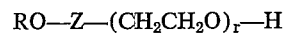
RO—Z—$(CH_2CH_2O)_r$—H wherein R represents an alkyl radical having from 1 to 8 carbon atoms, Z represents a combination of —$CH_2CH_2O$— and —$CH_2CH(CH_3)O$— radicals containing from 2 percent by weight to 5 percent by weight of —$CH_2CH_2O$— radicals, and $r$ is a whole integer, there being a sufficient number of —$CH_2CH_2O$— and —$CH_2CH(CH_3)O$— radicals present to impart an average molecular weight of from 2000 to 3500 to the polyalkylene glycol ether, and there being from 20 percent by weight to 80 percent by weight of —$CH_2CH_2O$— radicals present in said polyalkylene glycol ether;

(e) from 0.05 percent by weight to 0.3 percent by weight of potassium persulfate;

(f) from 0.15 percent by weight to 0.30 percent by weight of sodium acetate;

(g) from 0.2 percent by weight to 2.0 percent by weight of 2-(2-ethoxyethoxy)ethanol; and (h) from 41.0 percent by weight to 48.0 percent by weight of water.

16. An aqueous emulsion suitable for use in high-gloss water-based paints prepared by heating, at a temperature of from 65° C. to 85° C., a mixture consisting of:

(a) from 49.5 percent by weight to 56.5 percent by weight of vinyl acetate;

(b) from 0.2 percent by weight to 0.4 percent by weight of sodium vinyl sulfonate;

(c) from 0.25 percent by weight to 0.40 percent by weight of sodium lauryl sulfate;

(d) from 0.7 percent by weight to 1.5 percent by weight of a polyalkylene glycol ether selected from the group consisting of: polyalkylene glycol ethers represented by the general formula

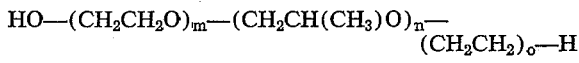
HO—$(CH_2CH_2O)_m$—$(CH_2CH(CH_3)O)_n$—$(CH_2CH_2)_o$—H wherein $m$, $n$ and $o$ are whole integers having a value sufficient to impart an average molecular weight of from 2000 to 3500 to the polyalkylene glycol ether, there being from 20 percent by weight to 80 percent by weight of —$CH_2CH_2O$— radicals present in said polyalkylene glycol ether; polyalkylene glycol ethers represented by the general formula

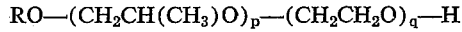
RO—$(CH_2CH(CH_3)O)_p$—$(CH_2CH_2O)_q$—H wherein R represents an alkyl radical having from 1 to 8 carbon atoms, and $p$ and $q$ are whole integers having a value sufficient to impart an average molecular weight of from 2000 to 3500 to the polyalkylene glycol ether, there being from 20 percent by weight to 80 percent by weight of —$CH_2CH_2O$— radicals present in said polyalkylene glycol ether; and polyalkylene glycol ethers represented by the general formula

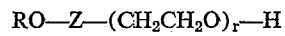
RO—Z—$(CH_2CH_2O)_r$—H wherein R represents an alkyl radical having from 1 to 8 carbon atoms, Z represents a combination of —$CH_2CH_2O$— and —$CH_2CH(CH_3)O$— radicals containing from 2 percent by weight to 5 percent by weight of —$CH_2CH_2O$— radicals, and $r$ is a whole integer, there being a sufficient number of —$CH_2CH_2O$— and —$CH_2CH(CH_3)O$— radicals present to impart an average molecular weight of from 2000 to 3500 to the polyalkylene glycol ether, and there being from 20 percent by weight to 80 percent by weight of —$CH_2CH_2O$— radicals present in said polyalkylene glycol ether;
  (e) from 0.05 percent by weight to 0.3 percent by weight of potassium persulfate;
  (f) from 0.15 percent by weight to 0.30 percent by weight of sodium acetate;
  (g) from 0.2 percent by weight to 2.0 percent by weight of 2-(2-ethoxyethoxy)ethyl acetate; and
  (h) from 41.0 percent by weight to 48.0 percent by weight of water.

17. A process for producing an aqueous emulsion suitable for use in high-gloss water-based paints which comprises forming a mixture of:
  (a) from 49.5 percent by weight to 56.5 percent by weight of vinyl acetate;
  (b) from 0.2 percent by weight to 0.4 percent by weight of a compound selected from the group consisting of alkali metal and ammonium salts of vinyl sulfonic acid;
  (c) from 0.25 percent by weight to 0.40 percent by weight of a compound selected from the group consisting of alkali metal and ammonium alkyl sulfate salts wherein the alkyl radicals each contain from 10 to 18 carbon atoms;
  (d) from 0.7 percent by weight to 1.5 percent by weight of a polyalkylene glycol ether selected from the group consisting of: polyalkylene glycol ethers represented by the general formula HO—$(CH_2CH_2O)_m$—$(CH_2CH(CH_3)O)_n$—
$(CH_2CH_2)_o$—H wherein $m$, $n$ and $o$ are whole integers having a value sufficient to impart an average molecular weight of from 2000 to 3500 to the polyalkylene glycol ether, there being from 20 percent by weight to 80 percent by weight of —$CH_2CH_2O$— radicals present in said polyalkylene glycol ether; polyalkylene glycol ethers represented by the general formula RO—$(CH_2CH(CH_3)O)_p$—$(CH_2CH_2O)_q$—H wherein R represents an alkyl radical having from 1 to 8 carbon atoms, and $p$ and $q$ are whole integers having a value sufficient to impart an average molecular weight of from 2000 to 3500 to the polyalkylene glycol ether, there being from 20 percent by weight to 80 percent by weight of —$CH_2CH_2O$— radicals present in said polyalkylene glycol ether; and polyalkylene glycol ethers represented by the general formula RO—Z—$(CH_2CH_2O)_r$—H wherein R represents an alkyl radical having from 1 to 8 carbon atoms, Z represents a combination of —$CH_2CH_2O$— and —$CH_2CH(CH_3)O$— radicals containing from 2 percent by weight to 5 percent by weight of —$CH_2CH_2O$— radicals, and $r$ is a whole integer, there being a sufficient number of —$CH_2CH_2O$— and —$CH_2CH(CH_3)O$— radicals present to impart an average molecular weight of from 2000 to 3500 to the polyalkylene glycol ether, and there being from 20 percent by weight to 80 percent by weight of —$CH_2CH_2O$— radicals present in said polyalkylene glycol ether;
  (e) from 0.05 percent by weight to 0.3 percent by weight of a water-soluble vinyl polymerization catalyst; and
  (f) from 41.0 percent by weight to 48.0 percent by weight of water;

and heating the admixture at a temperature of from 65° C. to 85° C.

18. A process as in claim 17 wherein the mixture also contains a water-soluble buffering agent capable of maintaining the pH of the emulsion between 3.9 and 5.2.

19. A process as in claim 18 wherein the mixture also contains from 0.2 percent by weight to 2.0 percent by weight of a water-soluble filming aid.

20. A process as in claim 18 wherein the vinyl sulfonic acid salt is sodium vinyl sulfonate.

21. A process as in claim 19 wherein the vinyl sulfonic acid is sodium vinyl sulfonate.

22. A process as in claim 19 wherein the buffering agent is sodium acetate.

23. A process as in claim 21 wherein the buffering agent is sodium acetate.

24. A process for producing an aqueous emulsion suitable for use in high-gloss water-based paints which comprises forming a mixture of:
  (a) from 49.5 percent by weight of 56.5 percent by weight of vinyl acetate;
  (b) from 0.2 percent by weight to 0.4 percent by weight of sodium vinyl sulfonate;
  (c) from 0.25 percent by weight to 0.40 percent by weight of sodium tridecyl sulfate;
  (d) from 0.7 percent by weight to 1.5 percent by weight of a polyalkylene glycol ether selected from the group consisting of: polyalkylene glycol ethers represented by the general formula HO—$(CH_2CH_2O)_m$—$(CH_2CH(CH_3)O)_n$—
$(CH_2CH_2)_o$—H wherein $m$, $n$ and $o$ are whole integers having a value sufficient to impart an average molecular weight of from 2000 to 3500 to the polyalkylene glycol ether, there being from 20 percent by weight to 80 percent by weight of —$CH_2CH_2O$— radicals present in said polyalkylene glycol ether; polyalkylene glycol ethers represented by the general formula RO—$(CH_2CH(CH_3)O)_p$—$(CH_2CH_2O)_q$—H wherein R represents an alkyl radical having from 1 to 8 carbon atoms, and $p$ and $q$ are whole integers having a value sufficient to impart an average molecular weight of from 2000 to 3500 to the polyalkylene glycol ether, there being from 20 percent by weight to 80 percent by weight of —$CH_2CH_2O$— radicals present in said polyakylene glycol ether; and polyalkylene glycol ethers represented by the general formula RO—Z—$(CH_2CH_2O)_r$—H wherein R represents an alkyl radical having from 1 to 8 carbon atoms, Z represents a combination of —$CH_2CH_2O$— and —$CH_2CH(CH_3)O$— radicals containing from 2 percent by weight to 5 percent by weight of —$CH_2CH_2O$— radicals, and $r$ is a whole integer, there being a sufficient number of

—$CH_2CH_2O$— and —$CH_2CH(CH_3)O$— radicals present to impart an average molecular weight of from 2000 to 3500 to the polyalkylene glycol ether, and there being from 20 percent by weight to 80 percent by weight of —$CH_2CH_2O$— radicals present in said polyalkylene glycol ether;
  (e) from 0.05 percent by weight to 0.03 percent by weight of potassium persulfate;
  (f) from 0.15 percent by weight to 0.30 percent by weight of sodium acetate;
  (g) from 0.2 percent by weight to 2.0 percent by weight of 2-(2-ethoxyethoxy)ethanol; and
  (h) from 41.0 percent by weight to 48.0 percent by weight of water;

and heating the admixture at a temperature of from 65° C. to 85° C.

25. A process for producing an aqueous emulsion suitable for use in high-gloss water-based paints which comprises forming a mixture of:
  (a) from 49.5 percent by weight of 56.5 percent by weight of vinyl acetate;

(b) from 0.2 percent by weight to 0.4 percent by weight of sodium vinyl sulfonate;
(c) from 0.25 percent by weight to 0.40 percent by weight of sodium lauryl sulfate;
(d) from 0.7 percent by weight to 1.5 percent by weight of a polyalkylene glycol ether selected from the group consisting of: polyalkylene glycol ethers represented by the general formula $$HO-(CH_2CH_2O)_m-(CH_2CH(CH_3)O)_n-(CH_2CH_2)_o-H$$

wherein $m$, $n$ and $o$ are whole integers having a value sufficient to impart an average molecular weight of from 2000 to 3500 to the polyalkylene glycol ether, there being from 20 percent by weight to 80 percent by weight of —$CH_2CH_2O$— radicals present in said polyalkylene glycol ether; polyalkylene glycol ethers represented by the general formula $$RO-(CH_2CH(CH_3)O)_p-(CH_2CH_2O)_q-H$$

wherein R represents an alkyl radical having from 1 to 8 carbon atoms, and $p$ and $q$ are whole integers having a value sufficient to impart an average molecular weight of from 2000 to 3500 to the polyalkylene glycol ether, there being from 20 percent by weight to 80 percent by weight of —$CH_2CH_2$— radicals present in said polyalkylene glycol ether; and polyalkylene glycol ethers represented by the general formula $$RO-Z-(CH_2CH_2O)_r-H$$

wherein R represents an alkyl radical having from 1 to 8 carbon atoms, Z represents a combination of —$CH_2CH_2O$— and —$CH_2CH(CH_3)O$— radicals containing from 2 percent by weight to 5 percent by weight of —$CH_2CH_2O$— radicals, and $r$ is a whole integer, there being a sufficient number of

—$CH_2CH_2O$— and —$CH_2CH(CH_3)O$— radicals present to impart an average molecular weight of from 2000 to 3500 to the polyalkylene glycol ether, and there being from 20 percent by weight to 80 percent by weight of —$CH_2CH_2O$— radicals present in said polyalkylene glycol ether;
(e) from 0.05 percent by weight to 0.3 percent by weight of potassium persulfate;
(f) from 0.15 percent by weight to 0.30 percent by weight of sodium acetate;
(g) from 0.2 percent by weight to 2.0 percent by weight of 2-(2-ethoxyethoxy)ethyl acetate; and
(h) from 41.0 percent by weight to 48.0 percent by weight of water;
and heating the admixture at a temperature of from 65° C. to 85° C.

References Cited by the Examiner
UNITED STATES PATENTS

| | | | |
|---|---|---|---|
| 2,300,920 | 11/1942 | Heuer | 260—29.6 |
| 2,508,341 | 5/1950 | Wilson | 260—29.6 |
| 2,601,315 | 6/1952 | Morrison et al. | 260—29.6 |
| 2,859,191 | 11/1958 | Turnbull | 260—29.6 |
| 2,892,802 | 6/1959 | Budewitz | 260—29.6 |
| 2,914,495 | 11/1959 | Gordon et al. | 260—29.6 |

References Cited by the Applicant
UNITED STATES PATENTS 2,567,678   9/1951   Morrison.

MURRAY TILLMAN, *Primary Examiner.*

W. J. BRIGGS, SR., *Assistant Examiner.*